US008964106B2

(12) United States Patent
Miyata

(10) Patent No.: US 8,964,106 B2
(45) Date of Patent: Feb. 24, 2015

(54) EXPOSURE CONTROL DEVICE AND ELECTRONIC CAMERA HAVING THE SAME

(75) Inventor: Masashi Miyata, Tokyo (JP)

(73) Assignee: Ricoh Imaging Company, Ltd., Tokyo (JP)

(*) Notice: Subject to any disclaimer, the term of this patent is extended or adjusted under 35 U.S.C. 154(b) by 578 days.

(21) Appl. No.: 13/157,588

(22) Filed: Jun. 10, 2011

(65) Prior Publication Data
US 2012/0008040 A1  Jan. 12, 2012

(30) Foreign Application Priority Data

Jul. 9, 2010  (JP) ................. 2010-156422

(51) Int. Cl.
H04N 5/238 (2006.01)
G03B 7/00 (2014.01)
H04N 5/235 (2006.01)

(52) U.S. Cl.
CPC ................. H04N 5/2353 (2013.01)
USPC ........................ 348/363; 348/362

(58) Field of Classification Search
USPC ............ 348/362–366, 229.1–230.1
See application file for complete search history.

(56) References Cited

U.S. PATENT DOCUMENTS

2008/0062277 A1* 3/2008 Hirai et al. ............ 348/229.1

FOREIGN PATENT DOCUMENTS

| JP | 2003-158667 | 5/2003 |
| JP | 2003-189175 | 7/2003 |
| JP | 2005-292740 | 10/2005 |
| JP | 2006-303760 | 11/2006 |
| JP | 2009-188879 | 8/2009 |

OTHER PUBLICATIONS

Canon Inc., Canon EOS Rebel T2i EOS 550d instruction manual, Jan. 2010, Canon Inc., CPH-E046-004, p. 62, 63, 134, 194, and 226.*
Japan Office action, dated Jan. 10, 2014 along with an English translation thereof.

* cited by examiner

Primary Examiner — Christopher K Peterson
(74) Attorney, Agent, or Firm — Greenblum & Bernstein, P.L.C.

(57) ABSTRACT

An exposure control device including a control unit configured to set a shutter speed and an aperture using a predetermined program chart based an exposure value calculated through photometry, an ISO sensitivity setting unit configured to set at least one of an upper limit and a lower limit of an ISO sensitivity to be used for photo shooting, and an ISO sensitivity change point determining unit configured to determine a point at which the ISO sensitivity is to be changed on the predetermined program chart.

9 Claims, 2 Drawing Sheets

EXPOSURE CONTROL DEVICE AND ELECTRONIC CAMERA HAVING THE SAME

BACKGROUND OF THE INVENTION

The present invention relates to an exposure control device and an electronic camera on which the exposure control device is mounted.

In general, in order to obtain proper exposure for shooting with an electronic camera, EV (exposure value) is obtained by the following APEX (Additive System of Photographic Exposure) operation.

$$EV=TV+AV=BV+SV \qquad (1)$$

In the expression (1), TV denotes a shutter speed defined in an APEX unit, and is 0 when the actual shutter speed is 1 second, and increases in increments of 1 each time the shutter speed increases by one step. AV denotes an aperture defined in the APEX unit, and is 0 when the actual aperture is f/1.0, and increases in increments of 1 each time the aperture is reduced by one step. BV denotes a brightness of an object defined in the APEX unit. SV denotes the exposure sensitivity defined in the APEX unit.

The words "proper exposure" means that the aperture and the shutter speed are adjusted such that the exposure at the brightest point of an object image on an imaging surface of an image pickup device and the exposure at the darkest point of the object image on the imaging surface of the image pickup device fall within an exposure range of the image pickup device. Therefore, for the same ISO sensitivity, it is necessary to make an adjustment so that the distribution of the exposure on the imaging surface of the image pickup device constantly falls within the same exposure range regardless of the brightness of the object image. When the ISO sensitivity is determined, a proper exposure range is determined. Then, the shutter speed is adjusted so that the brightness distribution of the object image matches the proper exposure range.

In the electronic camera, if the exposure sensitivity SV can be changed, the aperture AV, the shutter speed TV and the exposure sensitivity SV are calculated in accordance with the object brightness BV. Japanese Patent Provisional Publication No. 2003-189175A discloses an exposure control device configured to change the exposure sensitivity to obtain the proper exposure. In the exposure control device disclosed in the publication, the exposure EV is calculated from the object brightness BV and the set exposure sensitivity SVs. Then, a control aperture AVc and a control shutter speed TVc are determined based on the calculated exposure EV. Furthermore, an exposure deviation ΔEV is determined from the above described exposure EV, the aperture AVc and the shutter speed TVc, and then it is judged whether the exposure is proper based on the value of ΔEV. When the exposure is not proper, a control exposure sensitivity SVc is obtained using the set exposure sensitivity SVs and the value of ΔEV. By using the obtained control exposure sensitivity SVc in place of the exposure sensitivity SVs, it becomes possible to perform photo shooting while setting the proper exposure.

SUMMARY OF THE INVENTION

However, in the above described exposure control device, the aperture and the shutter speed are determined from the brightness of the object, and the exposure sensitivity is changed on the basis of necessity without considering an ISO sensitivity range set by a user. Therefore, if the photo shooting is performed by automatically changing the ISO sensitivity within the ISO sensitivity range set by the user, a problem arises that unintended camera shake or unintended shake of an object occurs because a condition for changing the ISO sensitivity is constant regardless of the fact that the user accepts performing the photo shooting while reducing the aperture or increasing the shutter speed by increasing the upper limit of the ISO sensitivity. In this case, the photo shooting may fail.

The present invention is advantageous in that it provides an exposure control device and an electronic camera capable of suitably performing the photo shooting to meet the user's intention while determining the aperture and the shutter speed in accordance with change of the ISO sensitivity by a user.

According to an aspect of the invention, there is provided an exposure control device which is provided with a control unit configured to set a shutter speed and an aperture using a predetermined program chart based an exposure value calculated through photometry, an ISO sensitivity setting unit configured to set at least one of an upper limit and a lower limit of an ISO sensitivity to be used for photo shooting, and an ISO sensitivity change point determining unit configured to determine a point at which the ISO sensitivity is to be changed on the predetermined program chart.

With this configuration, it becomes possible to modify a condition for changing the ISO sensitivity to be rapid or gentle. That is, since the point at which the ISO sensitivity is increased on the program chart can be changed in accordance with the range of the ISO sensitivity set by the user when the camera is set such that the ISO sensitivity can be changed automatically, it becomes possible to perform the photo shooting without failure while additionally considering acceptability to the noise which can be identified from the user setting.

In at least one aspect, the ISO sensitivity change point determining unit may be configured to change the point at which the ISO sensitivity is to be changed in accordance with increase or decrease of the upper limit of the ISO sensitivity by the ISO sensitivity setting unit.

In at least one aspect, the ISO sensitivity change point determining unit may be configured to change the point at which the ISO sensitivity is to be changed in accordance with increase or decrease of the lower limit of the ISO sensitivity by the ISO sensitivity setting unit.

In at least one aspect, the ISO sensitivity change point determining unit may be configured to change the point at which the ISO sensitivity is to be changed in accordance with increase or decrease of a width of a range of the ISO sensitivity by the ISO sensitivity setting unit.

In at least one aspect, wherein the ISO sensitivity change point determining unit may be configured to change the point at which the ISO sensitivity is to be changed, further in response to increase or decrease of one of an upper limit and a lower limit of the width of the range of the ISO sensitivity.

According to another aspect of the invention, there is provided an electronic camera, which is provided with one of the above described exposure control devices.

In at least one aspect, the ISO sensitivity change point determining unit may operate to determine the point at which the ISO sensitivity is to be changed when the electronic camera is in an ISO sensitivity automatic change mode and the ISO sensitivity extends over a plurality of ISO levels.

BRIEF DESCRIPTION OF THE ACCOMPANYING DRAWINGS

DETAILED DESCRIPTION OF THE EMBODIMENTS

Hereinafter, an embodiment according to the invention are described with reference to the accompanying drawings.

Figure 1:
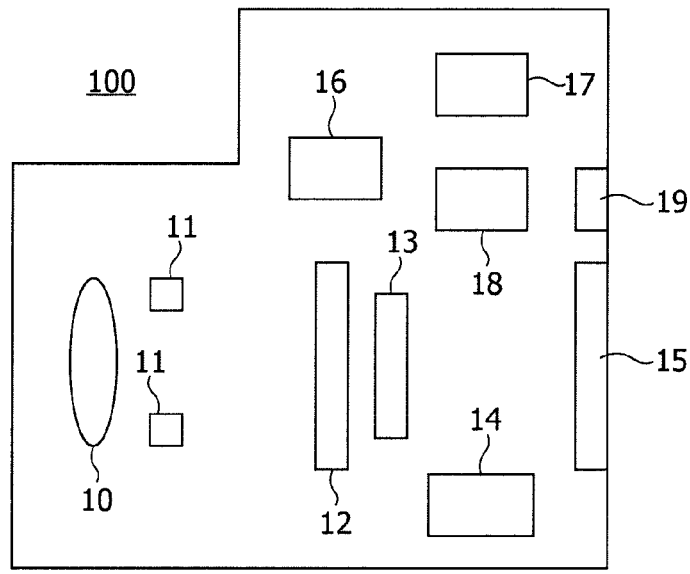
FIG. 1 is a block diagram generally illustrating a configuration of an electronic camera having an exposure control device according to an embodiment of the invention.

FIG. 1 illustrates an electronic camera 100 having an exposure control device according to the embodiment of the invention. Light from an object passes through an objective lens 10. The amount of light passed through the objective lens 10 is adjusted by an aperture stop 11. A focal plane shutter 12 is controlled to open for a predetermined time based on a shutter speed determined by a CPU 18 so that the light which has passed through the lens 10 and the aperture stop 11 proceeds to an image pickup device 13. The image pickup device 13 includes, for example, a CCD (Charge Coupled Device) or a CMOS (Complementary Metal-Oxide Semiconductor), and converts the received light into an image signal through photoelectric transfer.

In the image pickup device 13, the image signal obtained through the photoelectric transfer is subjected to the noise filtering out processing by an AFE (Analog Front End), and the image signal is converted into a digital signal. The image signal converted into the digital signal by the image pickup device 13 is sent to a video engine 14. In the video engine 14, various types of image processing, such as a white balance adjustment, a correction process, an interpolation process, a matrix operation, a γ-correction, edge emphasis and an image size conversion, are executed. The image signal which has been subjected to the image processing by the video engine 14 is displayed as a color image on an LCD (Liquid Crystal Display) 15. The image signal (image data) can be stored in an external storage medium, such as a SD memory card, inserted into the electronic camera 100 through a media controller (not shown).

The CPU 18 totally controls the electronic camera 100. Based on a control signal from a switch 19 serving as an input unit through which various user operations are conducted, the CPU 18 controls the components of the electron camera 18. In the following explanation, it is assumed that the electronic camera 100 is set such that the ISO sensitivity is automatically changed within an ISO sensitivity range set by a user (i.e., an ISO sensitivity automatic change mode). For example, when the user intends to obtain a high quality image having a low level of noise, for example, by taking measures for preventing the camera shake, the user sets the upper limit of the ISO sensitivity to a value on the lower sensitivity side. In the case where the user, being concerned about the camera shake, intends to securely obtain an image without failure even if an obtained image contains a noise to some extent, the user sets the upper limit of the ISO sensitivity to a value on the higher sensitivity side. In a memory 17, various types of data, such as a program chart and sensitivity settings necessary for various types of control for the electronic camera 100 are stored. In response to a user operation, the CPU 18 executes control of the electronic camera 100 by using the data stored in the memory 17.

A photometric sensor 16 is a sensor for obtaining information about the brightness of an object, and includes a photoelectric transfer device (e.g., a photodiode). The photometric sensor 16 includes a photo sensor unit which is configured to be divided into a plurality of regions in a matrix. The photometric sensor 16 has a visual field corresponding to substantially the whole imaging surface of the image pickup device 13. With respect to an output of the photometric sensor 16, the exposure operation is executed by the CPU 18 to calculate the brightness of the object.

Figure 2:
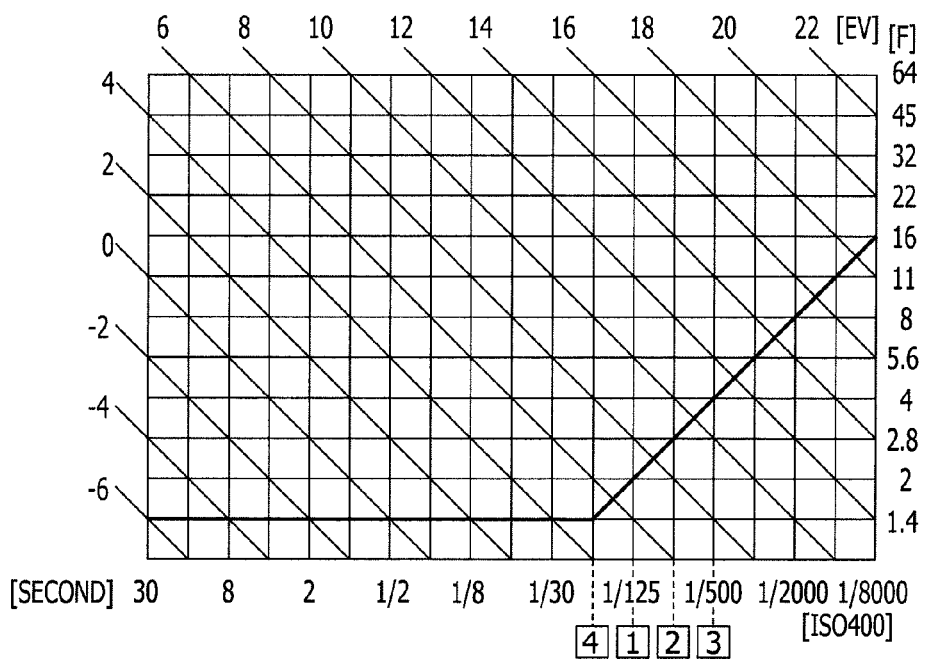
FIG. 2 shows a program chart used by the exposure control device according to the embodiment.

FIG. 2 shows a program chart used in this embodiment. The program chart shown in FIG. 2 is for the ISO sensitivity of ISO400. In FIG. 2, when the ISO sensitivity is increased, each EV value shifts to a larger value side while keeping the entire shape of the program chart. Specifically, when the ISO sensitivity is changed by one level from ISO400 to ISO800, a program chart for ISO800 is defined by shifting the program chart of ISO400 shown in FIG. 2 by 1EV to the larger value side. In this embodiment, EV is obtained based on the brightness of the object which is obtained from the output of the photometric sensor 16, and when a shutter speed slower than a shutter speed defined by the program chart from the obtained EV is selected, the ISO sensitivity is increased. By increasing the ISO sensitivity, the shutter speed defined by the obtained EV becomes high. As can be seen from FIG. 2, the shutter speed can be changed in increments of 1EV in EV conversion. Depending on a position on a graph of the program chart, the aperture also changes together with the shutter speed. For example, in the case of FIG. 2, the aperture and the shutter speed change together in the range of EV5 to EV19.

Next, the way of increasing the ISO sensitivity according to the embodiment is explained in detail. In this embodiment, first the user designates an acceptable range of ISO sensitivity for photo shooting. In general, the shake limit shutter speed depends on the focal length (a 35 mm film conversion value), and is defined as 1/(focal length) seconds. For example, when the focal length is 60 mm in 35 mm film conversion, the shake limit shutter speed is 1/60 seconds. With regard to the program chart according to the embodiment, when the range of ISO sensitivity is set to be a default value before setting change by the user, a point at which the ISO sensitivity is increased is set to a shutter speed corresponding to (the shake limit shutter speed)-1 EV.

Hereafter, an example of the way of changing the ISO sensitivity according to the embodiment is explained with reference to FIG. 2. We assume that the shake limit shutter speed of the lens 10 of the electronic camera 100 is 1/250 seconds for convenience of explanation. The user operates the switch 19 to change the ISO sensitivity range. In this case, we assume that the ISO sensitivity range set by the user is a default range of ISO400 to 1600. In this case, the point (shutter speed 1/125, aperture 2) indicated by "1" with a rectangular box (hereafter, referred to as the point "1") in FIG. 2 is defined as a point at which the ISO sensitivity is increased. When the user increases the upper limit of the ISO sensitivity by one level to change the ISO sensitivity range to ISO 400 to 3200, the point (shutter speed 1/250, aperture 2.8) indicated by "2" with a rectangular box (hereafter, referred to as the point "2") in FIG. 2 is defined as a point for which the ISO sensitivity is increased. When the user further increases the upper limit of the ISO sensitivity by one level to change the upper limit of the ISO sensitivity to ISO 400 to 6400, the point (shutter speed 1/500, aperture 4) indicated by "3" with a rectangular box (hereafter, referred to as the point "3") in FIG. 2 is defined as a point for which the ISO sensitivity is increased. The above described determination of the point at which the ISP sensitivity is increased is executed under control of the CPU 18.

Let us consider the case where the photometry has been executed and EV obtained based on an output of the photometric sensor 16 is 7. In the case where the ISO sensitivity range has been set by the user to ISO400 to 1600, the shutter speed and the aperture are set to 1/125 and 2, respectively, with respect to EV=7 in ISO 400. Since the determined shutter speed is not lower than the shutter speed at the point at which the ISO is increased in the default ISO sensitivity, the photo shooting is performed based on ISO400, the shutter speed 1/125 and the aperture 2 without increasing the ISO sensitivity.

Next, when the user sets the ISO sensitivity range to ISO400 to 3200, the shutter speed of 1/125 seconds set by the program chart of ISO400 becomes lower than the shutter speed of 1/250 seconds at the point "2" in FIG. 2. On the program chart of ISO400, EV corresponding to the shutter speed 1/250 seconds is 9. Therefore, the program chart is changed from the program chart of ISO400 to the program chart of ISO1600 by increasing two levels. On the program chart of the ISO1600, when EV is 7, the shutter speed and the aperture are set to 1/250 seconds and 2.8, respectively. Therefore, when the user sets the ISO sensitivity range to ISO400 to 3200, the photo shooting is performed in accordance with ISO1600, the shutter speed of 1/250 seconds and the aperture 2.8.

Similarly to the case where the user sets the ISO sensitivity range to ISO 400 to 3200, when the user sets the ISO sensitivity range to ISO 400-6400, the shutter speed of 1/125 defined by the program chart of the ISO 400 becomes lower than the shutter speed of 1/500 at the point indicated by "3". On the program chart of the ISO 400, EV corresponding to the shutter speed of 1/500 is 11. Therefore, the program chart to be used is changed by 4 levels from the program chart of the ISO 400 to the program chart of ISO 6400. According to the program chart at the ISO 6400, when EV is 7, the shutter speed and the aperture are set to 1/500 and 4, respectively. Therefore, when the user sets the ISO sensitivity range to ISO400 to 6400, the photo shooting is performed in accordance with ISO 6400, the shutter speed 1/500 seconds and the aperture 4.

When the user increases the ISO sensitivity of the program chart, the point at which the ISO sensitivity is increased (i.e., the shutter speed and the aperture) does not change although each EV shifts. Therefore, in the case where the ISO sensitivity set by the user is ISO400 to 1600, the point at which the ISO sensitivity is increased is also the shutter speed of 1/125 and the aperture 2 for the program chart other than the program chart of the ISO sensitivity of ISO 400.

Figure 3:
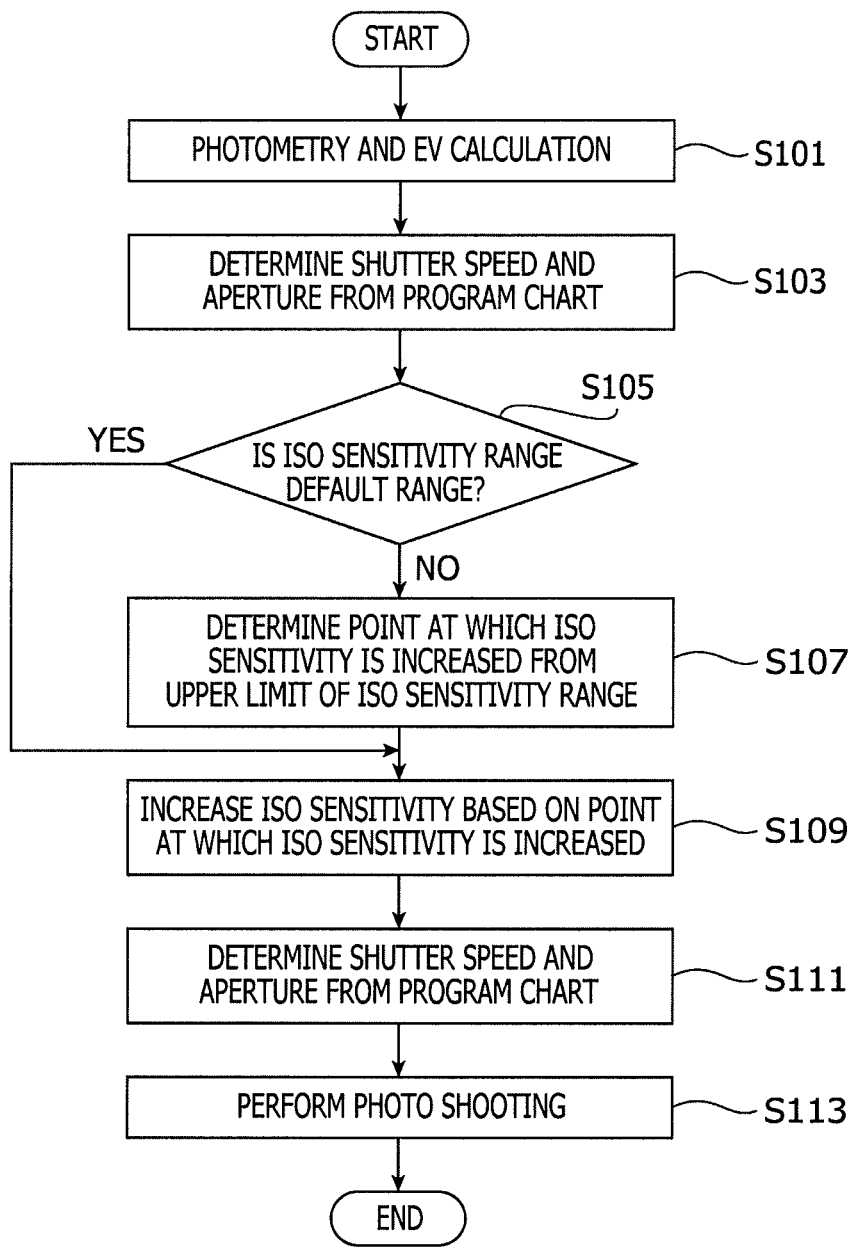
FIG. 3 is a flowchart illustrating an exposure control process according to the embodiment.

FIG. 3 is a flowchart illustrating an exposure control process executed under control of the CPU 18 according to the embodiment. We assume that, as in the case of FIG. 2, the default ISO sensitivity range is ISO400 to 1600, and the user has been set the ISO sensitivity in advance. First, EV is calculated based on the brightness of the object obtained based on output of the photometric sensor 16 (step S101). Next, based on the calculated EV, the shutter speed and the aperture are determined on the program chart of ISO400 which is the lower limit of the default ISO sensitivity range (step S103). Then, in step S105, it is judged whether the ISO sensitivity range set by the user is equal to the default range (ISO400 to 1600). When the user has changed the upper limit of the ISO sensitivity range from the default value (ISO 1600), the process proceeds to step S107. In step S107, the point on the program chart at which the ISO sensitivity is increased is determined based on the upper limit of the ISO sensitivity range set by the user. It should be noted that when it is judged that the default ISO sensitivity range is not changed by the user, the point at which the ISO sensitivity is increased is set to the shutter speed corresponding to (shake limit shutter speed)−1EV, and therefore the point does not need to be changed. Therefore, in the case, the process proceeds from step S105 to step S109.

In step S109, the CPU 18 compares the point (determined in step S105 or S107) at which the ISO sensitivity is increased with the point determined based on EV calculated in step S101. Then, the CPU 18 increases the ISO sensitivity in increments of 1 level from the ISO 400 until the shutter speed determined by EV calculated in step S101 (i.e., the shutter speed determined in step S103) does not become lower than the shutter speed of the point (determined in step S105 or S107) at which the ISO sensitivity is increased. In the case where the shutter speed determined by EV calculated in step S101 is lower than the shutter speed at the point (determined at step S105 or S107) at which the ISO sensitivity is increased even if the ISO sensitivity is increased to the upper limit of the ISP sensitivity set by the user, the ISO sensitivity is not increased any more, and the point determined by the program chart of the ISO sensitivity of the upper limit is employed.

When the ISO sensitivity is increased in step S109, in step S111 the shutter speed and the aperture are determined from EV calculated in step S101 using the program chart of the ISP sensitivity set in S109.

Therefore, when the user increased the upper limit of the ISO sensitivity, it is regarded that the tolerance to a noise in an obtained image also becomes high in accordance with increase of the ISO sensitivity, and when the brightness of the object is low, it becomes possible to perform photo shooting by aggressively increasing the ISP sensitivity while using, as threshold values, a larger aperture and a higher shutter speed on the program chart. Consequently, it becomes possible to securely perform photo shooting without failure while suppressing the noise level within an acceptable range set by the user.

Although the present invention has been described in considerable detail with reference to certain preferred embodiments thereof, other embodiments are possible.

In the above described embodiment, the user changes the upper limit of the ISO sensitivity. However, the user may change the lower limit of the ISO sensitivity. Even when the user changes the lower limit of the ISO sensitivity, it is possible to determine the shutter speed and the aperture from the program chart by changing the ISO sensitivity. When the user changes the lower limit of the ISO sensitivity, a point at which the ISO sensitivity is changed shifts to the direction in which the shutter speed becomes lower. That is, regarding the program chart of ISO400 shown in FIG. 2, when the user sets the lower limit of the ISO sensitivity range (ISO400 to 1600) to the ISO 200 by decreasing the lower limit by one level, the point at which the ISO sensitivity is increased is a point indicated by "4" with a rectangular box in FIG. 2.

Therefore, when the lower limit of the ISO sensitivity is decreased, it is regarded that the user wants to suppress increase of the ISO sensitivity as small as possible and allows the shutter speed to become slower. Therefore, by setting, as a point at which the ISO sensitivity is increased, a point corresponding to a shutter speed slower than a shutter speed of a default point and by controlling the increase of the ISO sensitivity, it becomes possible to realize the photo shooting at a suitable ISO sensitivity while employing the slower shutter speed intended by the user.

Furthermore, by shifting the point at which the ISO sensitivity is increased in the direction in which the shutter speed increases or the direction in which the shutter speed decreases in response to increase or decrease of the number of levels of the ISO sensitivity within the ISO sensitivity range (i.e., the width of the ISO sensitivity), it becomes possible to make a selection of ISO sensitivity while responding flexibly to change of the ISO sensitivity by the user.

Regarding the program chart shown in the above described embodiment, for example, with respect to the width set by two levels of ISO400 to 1600, the point "1" is set as the point at which the ISO sensitivity is increased for the ISO sensitivity range. In this case, when the user increases the width of the ISO sensitivity to the 4 level of ISO 400 to 6400, the point at which the ISO sensitivity is increased is changed to the point "2" or "3". When the user changes the ISO sensitivity from the "ISO400 to 1600" to "ISO100 to 1600", the point at which the ISO sensitivity is increased is changed to the point "2" or "3" as in the case where the ISO sensitivity is changed to ISO 400 to 6400, because the width of the ISO sensitivity is widened to 4 levels. As described above, it is possible to achieve the advantages of the invention by changing the point at which the ISO sensitivity is increased based on the width of the ISO sensitivity changed by the user.

In addition to the width of the ISO sensitivity set by the user, it is possible to change the point at which the ISO sensitivity is increased while considering the upper and lower limits of the ISO sensitivity. Let us consider the case where the ISO sensitivity is set to "ISO100 to 1600" and the case where the ISO sensitivity is set to "ISO400 to 6400". In each of these cases, the width of the ISO sensitivity is 4 levels. Regarding the "ISO100 to 1600", the point at which the ISO sensitivity is increased is changed from the point "1" to the point "2" (not the point "3"), because the ISO100 to 1600 is on the lower sensitivity side. Regarding the "ISO400 to 6400", the point at which the ISO sensitivity is increased is changed from the point "1" to the point "3" (not the point "2"), because the "ISO400 to 6400" is on the higher sensitivity side. As described above, by making a difference in the way of changing the point at which the ISO sensitivity is increased between the case where the ISO sensitivity range is on the lower sensitivity side and the case where the ISO sensitivity is on the higher sensitivity side even when the two ISO sensitivity widths are equal to each other, by regarding that, for the ISO sensitivity range on the lower sensitivity side, the user concerns about a noise and that, for the ISO sensitivity range on the higher sensitivity side, the user concerns more about the camera shake, it becomes possible to perform the photo shooting while more precisely reflecting the user's intention.

In the above described embodiment, the user does not designate the shutter speed and the aperture. However, even when the shutter speed and the aperture are fixed, it is possible to perform the photo shooting precisely reflecting the user's intention by determining the point at which the ISO sensitivity is increased based on EV calculated through photometry and the fixed shutter speed and the aperture, and by changing the ISO sensitivity in accordance with the program chart based on the determined point.

In the above described embodiment, the point at which the ISO sensitivity is increased is determined with respect to the shutter speed. However, the point may be determined with respect to the aperture. When the point is changed with respect to the aperture, the point at which the ISO sensitivity is increased is determined additionally considering the open aperture of each lens. In the above described embodiment, the brightness of the object is calculated based in the output of the photometric sensor. However, the brightness of the object may be calculated based on the output of the image pickup device.

This application claims priority of Japanese Patent Application No. P2010-156422, filed on Jul. 9, 2010. The entire subject matter of the application is incorporated herein by reference.

What is claimed is:

1. An exposure control device, comprising:
a control unit configured to set a shutter speed and an aperture using a predetermined program chart based on an exposure value calculated through photometry;
an ISO sensitivity setting unit configured to set at least one of an upper limit and a lower limit of an ISO sensitivity to be used for photo shooting; and
an ISO sensitivity change point determining unit configured to determine a point at which the ISO sensitivity is to be changed on the predetermined program chart;
wherein the ISO sensitivity change point determining unit is configured to change the point at which the ISO sensitivity is to be changed in accordance with increase or decrease of the upper limit of the ISO sensitivity by the ISO sensitivity setting unit.

2. An exposure control device, comprising:
a control unit configured to set a shutter speed and an aperture using a predetermined program chart based on an exposure value calculated through photometry;
an ISO sensitivity setting unit configured to set at least one of an upper limit and a lower limit of an ISO sensitivity to be used for photo shooting; and
an ISO sensitivity change point determining unit configured to determine a point at which the ISO sensitivity is to be changed on the predetermined program chart;
wherein the ISO sensitivity change point determining unit is configured to change the point at which the ISO sensitivity is to be changed in accordance with increase or decrease of the lower limit of the ISO sensitivity by the ISO sensitivity setting unit.

3. An exposure control device, comprising:
a control unit configured to set a shutter speed and an aperture using a predetermined program chart based on an exposure value calculated through photometry;
an ISO sensitivity setting unit configured to set at least one of an upper limit and a lower limit of an ISO sensitivity to be used for photo shooting; and
an ISO sensitivity change point determining unit configured to determine a point at which the ISO sensitivity is to be changed on the predetermined program chart;
wherein the ISO sensitivity change point determining unit is configured to change the point at which the ISO sensitivity is to be changed in accordance with increase or decrease of a width of a range of the ISO sensitivity by the ISO sensitivity setting unit.

4. The exposure control device according to claim 3,
wherein the ISO sensitivity change point determining unit is configured to change the point at which the ISO sensitivity is to be changed, further in response to increase or decrease of one of an upper limit and a lower limit of the width of the range of the ISO sensitivity.

5. An electronic camera, comprising:
an exposure control device including:
a control unit configured to set a shutter speed and an aperture using a predetermined program chart based on an exposure value calculated through photometry;
an ISO sensitivity setting unit configured to set at least one of an upper limit and a lower limit of an ISO sensitivity to be used for photo shooting; and
an ISO sensitivity change point determining unit configured to determine a point at which the ISO sensitivity is to be changed on the predetermined program chart;
wherein the ISO sensitivity change point determining unit is configured to change the point at which the ISO sensitivity is to be changed in accordance with increase or decrease of the upper limit of the ISO sensitivity by the ISO sensitivity setting unit.

6. The electronic camera according to claim 5,
wherein the ISO sensitivity change point determining unit operates to determine the point at which the ISO sensitivity is to be changed when the electronic camera is in an ISO sensitivity automatic change mode and the ISO sensitivity extends over a plurality of ISO levels.

7. An electronic camera, comprising:
an exposure control device including:
- a control unit configured to set a shutter speed and an aperture using predetermined program chart based on an exposure value calculated through photometry;
- an ISO sensitivity setting unit configured to set at least one of an upper limit and a lower limit of an ISO sensitivity to be used for photo shooting; and
- an ISO sensitivity change point determining unit configured to determine a point at which the ISO sensitivity is to be changed on the predetermined program chart;

wherein the ISO sensitivity change point determining unit is configured to change the point at which the ISO sensitivity is to be changed in accordance with increase or decrease of the lower limit of the ISO sensitivity by the ISO sensitivity setting unit.

8. An electronic camera, comprising:
an exposure control device including:
- a control unit configured to set a shutter speed and an aperture using a predetermined program chart based on an exposure value calculated through photometry;
- an ISO sensitivity setting unit configured to set at least one of an upper limit and a lower limit of an ISO sensitivity to be used for photo shooting; and
- an ISO sensitivity change point determining unit configured to determine a point at which the ISO sensitivity is to be changed on the predetermined program chart;

wherein the ISO sensitivity change point determining unit is configured to change the point at which the ISO sensitivity is to be changed in accordance with increase or decrease of a width of a range of the ISO sensitivity by the ISO sensitivity setting unit.

9. The electronic camera according to claim 8,
wherein the ISO sensitivity change point determining unit is configured to change the point at which the ISO sensitivity is to be changed, further in response to increase or decrease of one of an upper limit and a lower limit of the width of the range of the ISO sensitivity.

* * * * *